UNITED STATES PATENT OFFICE.

R. SIMONS, OF ROCKFORD, ILLINOIS.

IMPROVEMENT IN CEMENTS FOR ROOFING.

Specification forming part of Letters Patent No. 20,173, dated May 4, 1858.

*To all whom it may concern:*

Be it known that I, RICHARD SIMONS, of Rockford, in the county of Winnebago and State of Illinois, have invented and discovered a new and useful Composition for Roofing Houses; and I do hereby declare that the following is a full and exact description thereof, reference being had to the accompanying ingredients.

The nature of my invention consists in compounding the following ingredients without the usual inconvenience of heating over a fire, as is the case with all the modes now made use of. I have found that heating the materials for the compositions of roofs is injurious to the materials, and that many persons will not have roofs put on when the materials are heated, and, besides, there is always great danger in using the article in a heated state, and there is nothing gained in time or convenience in heating over my method.

To enable others skilled in the art to compound and use my invention, the following proportions will be found quite practicable.

To thirty (30) gallons of good coal-tar I add two (2) gallons of prepared india-rubber dissolved in turpentine, and two (2) gallons of prepared gum-shellac in alcohol, to which I add one gallon of boiled linseed-oil and four and a half (4½) pounds of rosin well pulverized. The above ingredients I put into a suitable cask and let stand for thirty (30) hours, stirring it occasionally. I now take one peck of good water-lime, two (2) quarts of clean well-prepared plaster-of-paris, two (2) pounds of whiting, two (2) pounds of yellow ocher, and two and a half (2½) pounds of Spanish brown. The last-named articles I mix thoroughly together and sift through a fine sieve, being sure that no coarse matter passes through. This forms a mass for use in the same way that any other powder may be mixed with oil. I now draw off any desired quantity of the prepared tar and other ingredients into a bucket, and mix the powder for use; or the whole may be mixed together, if preferred. The next process is to apply it to the roof, after the cloth is prepared on the roof, with a suitable brush. I proceed to give the cloth a good coating of the mixture. I let it stand twenty-four hours, and then put on another coating, covering it with clean sand or gravel. As I proceed, this done, I let it stand twenty-six (26) to thirty-six (36) hours, and put on another coat of the mixture and a second coating of sand, sweep off the waste sand, and the roof is complete.

Having thus fully described my composition, what I claim, and desire to secure by Letters Patent, is—

The composition of ingredients when compounded in the manner set forth.

RICHARD SIMONS.

Attest:
 F. S. MYER,
 R. R. HUGGES.